United States Patent [19]

Penick

[11] Patent Number: 4,755,281
[45] Date of Patent: Jul. 5, 1988

[54] COUNTERCURRENT PROCESS WITH FROTH CONTROL FOR TREATING HEAVY HYDROCARBONS

[75] Inventor: Joe E. Penick, Princeton, N.J.

[73] Assignee: Mobil Oil Corporation, New York, N.Y.

[21] Appl. No.: 789,219

[22] Filed: Oct. 18, 1985

Related U.S. Application Data

[62] Division of Ser. No. 605,740, May 1, 1984, Pat. No. 4,550,012.

[51] Int. Cl.[4] ...................... C10G 13/10; C10G 13/06
[52] U.S. Cl. .................................. 208/108; 208/111;
   208/142; 208/120; 208/209; 208/146;
   208/DIG. 1
[58] Field of Search ............... 208/108, 107, 111, 146,
   208/158, 142, 209, 157, DIG. 1, 120; 422/106,
   112, 195, 220, 191; 55/87, 178, 210

[56] References Cited

U.S. PATENT DOCUMENTS

| | | | |
|---|---|---|---|
| 2,743,998 | 5/1956 | Swart et al. | 422/112 |
| 2,918,425 | 12/1959 | Berger et al. | 208/143 |
| 3,151,061 | 9/1964 | Orr | 422/122 |
| 3,310,367 | 3/1967 | Mavrovic | 23/61 |
| 3,363,992 | 1/1968 | Chervenak | 422/211 |
| 3,397,123 | 8/1968 | Cull | 422/211 |
| 3,499,734 | 3/1970 | Newman et al. | 422/191 |
| 3,609,176 | 9/1971 | Alagy et al. | 422/211 |
| 4,003,724 | 1/1977 | Payne et al. | 55/87 |
| 4,126,539 | 11/1978 | Derr, Jr. et al. | 208/108 |
| 4,146,465 | 3/1979 | Blazek, Sr. et al. | 208/120 |
| 4,176,047 | 11/1979 | Orrell et al. | 208/51 |
| 4,194,964 | 3/1980 | Chen et al. | 208/108 |
| 4,213,847 | 7/1980 | Chen et al. | 208/111 |
| 4,235,847 | 11/1980 | Scott | 422/220 |
| 4,380,529 | 4/1983 | Gupta | 422/191 |
| 4,550,012 | 10/1985 | Penick | 422/106 |

Primary Examiner—Glenn Caldarola
Attorney, Agent, or Firm—Alexander J. McKillop; Michael G. Gilman; L. G. Wise

[57] ABSTRACT

A countercurrent technique is disclosed for contacting liquid and gas reactants in a fixed porous catalyst bed. The reactants are maintained as a multiphase mixture in the catalyst bed. Upwardly flowing dispersed gas is disengaged from liquid feedstock above the catalyst bed, while controlling froth level.

12 Claims, 2 Drawing Sheets

COUNTERCURRENT PROCESS WITH FROTH CONTROL FOR TREATING HEAVY HYDROCARBONS

This is a division of copending application Ser. No. 605,740, filed on May 1, 1984, now U.S. Pat. No. 4,550,012.

BACKGROUND OF THE INVENTION

This invention relates to catalytic reactor operation wherein a liquid phase is treated with a gaseous reactant. In particular it relates to a technique for contacting multi-phase reactants in a fixed porous catalyst bed under continuous countercurrent conditions, including methods and apparatus for controlling frothing in the reactor.

Chemical reactions between liquid and gaseous reactants present difficulties in obtaining intimate contact between phases. Such reactions are further complicated when the desired reaction is catalytic, and requires contact of both fluid phases with a solid catalyst. Numerous multi-phase reactor systems have been developed wherein a fixed porous bed of solid catalyst is retained in a reactor. Typically, fixed bed reactors have been arranged with the diverse phases being passed cocurrently over the catalyst, for instance as shown in U.S. Pat. Nos. 4,126,539 (Derr et al), 4,235,847 (Scott), 4,283,271 (Garwood et al), and 4,396,538 (Chen et al). In the petroleum refining industry, multi-phase catalytic reactor systems have been employed for dewaxing, hydrogenation, desulfurizing, hydrocracking, isomerization and other treatments of liquid feedstocks, especially distillates, lubricants, heavy oil fractions, residuum, etc,. Other known techniques for contacting liquid-gas mixtures with solid catalysts include slurry catalyst, ebullated bed and countercurrent systems, such as disclosed in U.S. Pat. Nos. 2,717,202, 3,186,935, 4,221,653, and 4,269,805. The above cited patents are incorporated herein by reference. While prior reactor systems are satisfactory for certain needs, efficient multi-phase contact has been difficult to achieve for many fixed bed applications.

It is an object of the present invention to provide a unique reactor system, including countercurrent operating techniques and apparatus for improved treatment of liquid with a gaseous reactant in a reactor containing a porous fixed bed of solid catalyst. It is a further object to provide such multi-phase reactor operating under controlled flow conditions to maintain a gas-liquid froth, while minimizing flow maldistribution patterns and providing optimum volumetric proportions of upwardly moving gas dispersed in a downwardly gravitating liquid phase.

SUMMARY OF THE INVENTION

A technique has been devised for treatment of liquids in a multi-phase catalytic reaction zone containing a fixed porous bed of solid catalyst. The improvement herein comprises methods and means for introducing feed stock predominately in liquid phase and distributing the feedstock uniformly over the catalyst bed for downward flow in contact with the catalyst, introducing a pressurized reactant gas below the catalyst bed at a rate to establish countercurrent contact dispersed in downcoming liquid, disengaging upwardly flowing dispersed gas from feedstock above the catalyst bed while controlling froth level to prevent substantial entrainment of liquid in disengaged gas; and recovering treated liquid and offgas. This technique is particularly useful in a process for catalytic hydrogenation, hydrocracking or desulfurizing of heavy petroleum feedstock.

In a preferred embodiment, a feedstock which consists essentially of waxy oil is contacted with catalyst comprising a ZSM-5 type medium pore zeolite under superatmospheric process conditions at elevated temperature.

The control subsystem includes level detector means disposed in a froth zone above the catalyst bed for detecting level of a mixed gas-liquid froth and generating a signal representative of froth level; and fluid handling control means responsive to the level signal to control fluid stream flow for regulating froth level above the catalyst bed, thereby permitting disengagement of dispersed gas from the liquid phase of the froth and preventing excessive liquid entrainment in the gas outlet.

These and other features and advantages of the invention will be seen in the following description and drawing.

DESCRIPTION OF PREFERRED EMBODIMENTS

Figure 1:
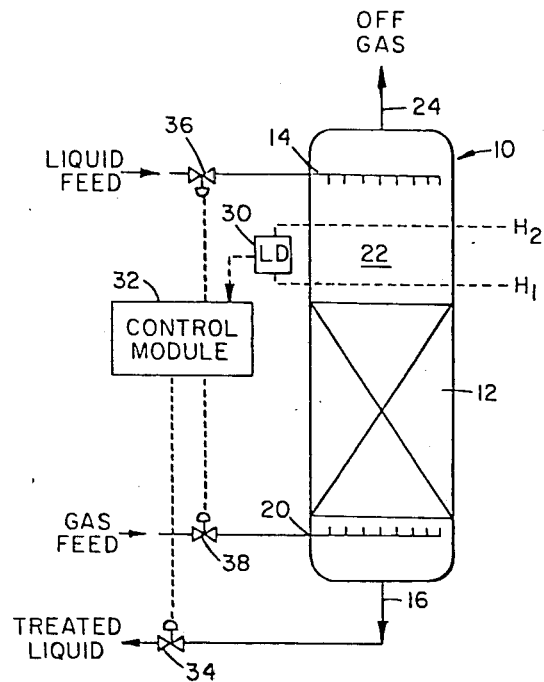
FIG. 1 is a simplified process diagram showing a vertical reactor with fixed catalyst bed, major flow streams, and control elements.

Countercurrent processes for contacting reactant fluids have several advantages. In a single point gas entry system, as the reactant gas rises upwardly from its point of introduction at the bottom of a vertical reactor below the porous bed, it contacts a lower concentration of reactive liquid components. At the point of entry the reactant gas has its greatest concentration. Depletion of the gaseous reactant upwardly will increase the relative concentration of inerts and/or byproduct vapors. Likewise, the liquid being treated is generally more reactive at the upper end of the reactor system where it contacts the depleted rising gaseous phase. Thus, the reactant concentration gradients for countercurrent two-phase systems are opposing. In a typical multi-phase reactor system, the average gas-liquid volume ratio in the catalyst zone is about 1:4 to 4:1 under process conditions.

In those reactions wherein the volume of gas decreases due to reactant depletion, the volumetric ratio or liquid to gas can increase markedly as the liquid feedstock gravitates downwardly through the reactor. In reactions which consume large amounts of hydrogen it may be desirable to have multiple reaction gas feed grids at various levels in the catalyst bed. In general, the quantity of unreacted gas at any particular level should be adequate to provide a mixed phase bulk density of at least 20% of the bulk density of the liquid phase (at reaction conditions). Vapor production, adiabatic heating or expansion can also affect the volume.

Advantageously, the multi-phase reactor system is operated to achieve uniform distribution. If too little liquid flux is maintained, the catalyst surface in the porous bed will be coated with a liquid film; however, this trickle mode will permit excessive channeling of the gas phase instead of the desired dispersion characteristics of a reactant froth. Flow rates for both reactant phases are controlled within constraints. Froth formation and disengagement is a function of the liquid viscosity, surface tension and composition. By detecting and controlling froth level, the proper operation of the reactor can be assured.

In order to maintain a desirable uniform flow of reactant streams through the fixed catalyst bed, adequate flow paths for liquid and gaseous phases must be provided. In a continuous process the ratio of reactant gas to liquid feedstock and the space velocity of reactants relative to catalyst must be carefully considered. Achievement of uniform vertical flow through a porous bed of solids can be obtained if the catalyst is properly distributed and shaped. The void volume in a reaction zone is a function of catalyst configuration and loading technique. While a densely packed bed of spherical solids may be employed to place a maximum amount of catalyst in a predetermined reactor volume, the low void fraction may interfere with fluid flow, especially where countercurrent flow of two phases is required. Advantageously, the catalyst bed has a high void volume, typically greater than one-half of the bed. Void fractions from 0.5 to 0.9 can be achieved using loosely packed polylobal or cylindrical extrudates. Hollow ring-type supported catalysts, such as Raschig rings or the like, permit liquids to flow downwardly through the porous bed by gravity while the gas phase reactant rises through the denser liquid, forming dispersed bubbles which contact the wetted catalyst to enhance mass transfer and catalytic phenomena.

Catalyst size can vary widely within the inventive concept, depending upon process conditions and reactor structure. If a low space velocity or long residence in the catalytic reacton zone is permissible, small catalysts having an average maximum dimension of 1 to 5 mm may be employed. However, it is preferred to use larger sizes, e.g., 0.5-2 cm or more, especially when extrudates, rings, saddles or other contact materials are desired. Relatively small catalyst particles may be loaded randomly to assure uniformity and larger supported catalysts may be stacked in a geometric pattern to achieve optimum bed utilization.

Reactor configuration is an important consideration in the design of a continuously operating system. In its simplest form, a vertical cylindrical pressure vessel is provided with a catalyst retaining means and operatively connected for countercurrent fluid flow. A typical vertical reactor having a catalyst bed length to effective diameter (L:D) ratio of about 1:1 to 20:1 is preferred. A single bed or a stacked series of beds may be retained within the same reactor shell. While a reactor of uniform horizontal cross section is disclosed herein, other non-uniform configurations, such as spherical reactors, tapered vessels, etc., may be employed.

Referring to FIG. 1, a countercurrent continuous catalytic reactor system is shown for treating a liquid phase with a gaseous reactant. An enclosed reactor shell 10 contains a fixed porous bed 12 of solid catalyst. Upper liquid inlet means 14 is provided for introducing a stream of liquid substantially above the catalyst bed for downward gravity flow through the bed toward lower liquid outlet means 16 for withdrawing treated liquid from the reactor shell. Gas inlet means 20 is disposed below the catalyst bed for introducing a gaseous reactant stream under pressure for countercurrently contacting downwardly flowing liquid in a mixed phase reaction zone, whereby gaseous reactant is dispersed through the liquid phase in intimate contact with the solid catalyst. After passing through a reactant disengagement zone 22 above the catalyst bed 22 through upper gas outlet means 24, gas is withdrawn from the reactor shell.

Level detector means 30 is disposed in a froth zone between interface the levels $H_1$ and $H_2$ above the catalyst bed for detecting level of a mixed gas-liquid froth and generating a signal representative of the froth level. Fluid handling control means such as control module 32 is responsive to the level signal to control fluid stream flow for regulating froth level above the catalyst bed, thereby permitting disengagement of dispersed gas from the liquid phase of the froth and preventing excessive liquid entrainment in the gas outlet. The fluid handling control may include liquid outlet valve means 34 for withdrawing treated liquid at increased rate with increased froth level. Liquid and gas reactant feed rates may be controlled proportionally or as otherwise predetermined by setting control module 32 to operate liquid feed valve means 36 and/or gas +eed valve means 38. Inlet flow control may be employed to vary the interface or froth level, as well as reactant proportions.

Figure 2:
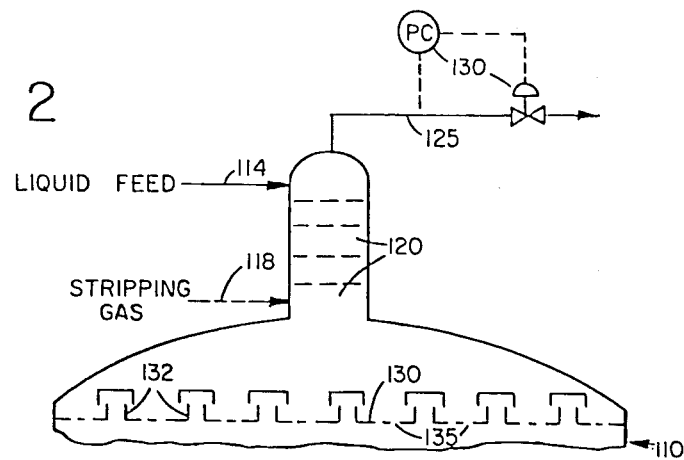
FIG. 2 is a segmented vertical cross-section view of a reactor showing stripping and distributor sections.
Figure 3:
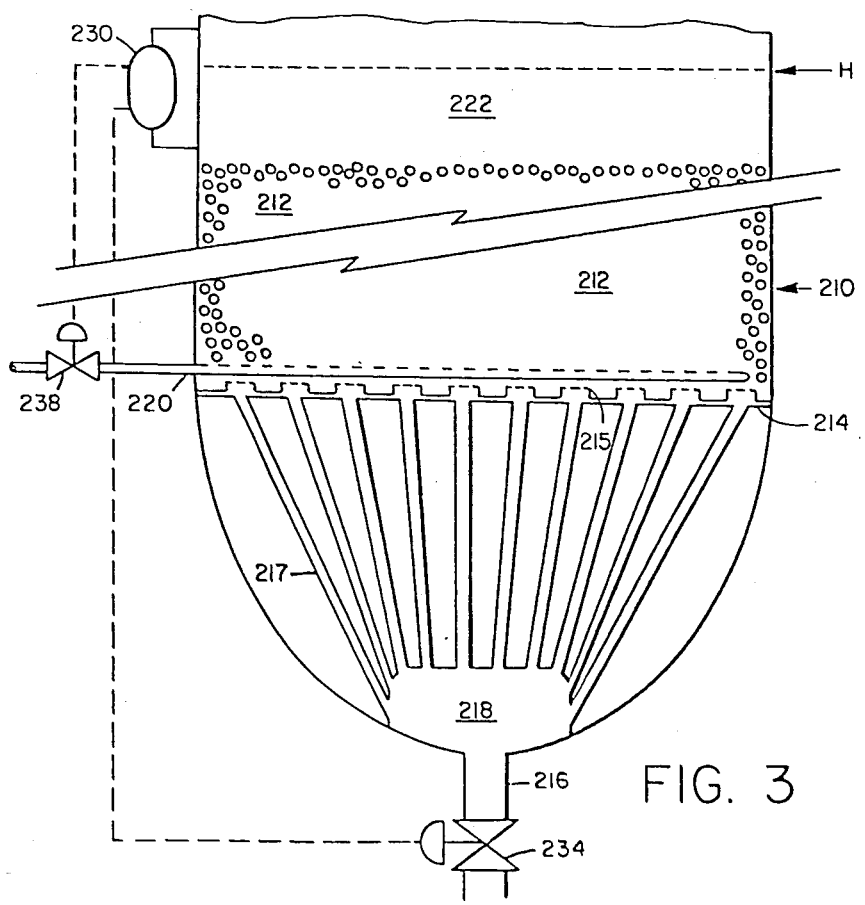
FIG. 3 is a countercurrent catalyst bed, according to the present invention, shown in segmented vertical cross section aligned with the optional top section of FIG. 2.

A more detailed depiction of a catalytic reactor system, for use with the present invention is shown in FIGS. 2 and 3, both of which are segments of a vertical reactor. FIG. 2 is a top segment of a reactor 110 having upper liquid feed inlet 114 for introducing the charged feed to an optional stripping section 120. In a typical application, such as lube oil dewaxing or mild desulfurization, the preheated liquid feed is introduced into the upper part of a stripping section, where the feed is stripped of volatile components, dissolved and entrained contaminants by countercurrent stripping with the product gas stream rising from the catalyst bed. The gas stream is removed from the reactor through top gas outlet 125, which may have a back pressure regulator 130 responsive to pressure of the enclosed reactor. Additional stripping gas may be introduced via inlet 118 into the lower part of the stripping section, if desired. The quantity of stripping gas should be sufficient to saturate the entering liquid feed with the gas plus enough additional gas to achieve the desired removal of contaminants such as entrained water, $H_2S$, water vapor, and the like. The temperature and pressure in the stripping zone approximate the conditions desired in the catalyst bed. It is understood that the feed stripping feature may not be required in all instances.

The liquid feed flowing down from the stripper (or directly from the feed source if a stripper is not employed) passes to a horizontal distributor tray 130 which spreads the liquid across the catalyst bed. The distributor tray is provided with gas rivers 132 to allow rising gas to pass through the tray and proceed upwardly. A typical distributor tray has a spaced array of perforations or orifices 135 sized to allow even liquid stream flow from the upper surface of the horizontal tray 130 into the disengagement zone below, further depicted in FIG. 3.

Referring to FIG. 3, the bottom segment of a typical vertical reactor shell 210 is shown in broken vertical cross section view. A bed of catalyst particles 212 is maintained wi hin the main central portion of reactor 210 by a catalyst support grid 214, having retainer means 215 to prevent loss of particles from the bed. A plurality of liquid collector pipes 217 provide means for recovering treated liquid via plenum chamber 218, outlet conduit 216 and liquid control valve 234. Flow equalizing restrictions may be employed with the collector pipes to assure even withdrawal. Reaction gas is injected into the lower part of the catalyst bed through a gas sparger-type inlet means 220. This device may employ a grid with nozzles in a known manner to obtain substantially uniform gas bubble streams. Gas injected into the lower part of the catalyst bed rises through the descending column of liquid and creates a froth or foam. This froth can have a bulk density of between 20% and 80% of the density of the liquid feed (at reaction conditions), and normally consists essentially of a continuous liquid phase with gas bubbles dispersed therein. Above the catalyst bed 212, the rising gas becomes disengaged from the two phase froth in zone 222. Interface level controller 230 senses the density by measuring differential pressure of the fluids between its pressure taps and regulates the flow of liquid from valve 234 at the bottom of the reactor and/or reactant gas inlet valve 238 to maintain the froth-to-gas interface at the desired level H above the top of the catalyst bed.

It should be understood that a sharp interface may not exist, but rather a vertical gradient in bulk density can prevail in the disengagement zone. This gradient in density can be used to regulate flow of liquid from the bottom of the reactor. The froth level detector means may employ any of several techniques for locating the interface within the disengagement zone. While differential pressure taps disposed at upper and lower points on the reactor shell adjacent the disengagement zone are suitable, other detectors, such as radiation gauges and the like, may be employed.

Catalyst particles should be of a size (e.g., ¼") that they will not easily be dislodged by the rising gas bubbles. Catalyst holddown screens across the top and perhaps at intermediate points in the reactor bed may be helpful in minimizing catalyst motion. Multiple catalyst beds with means for redistribution between beds may be useful in some applications. Likewise mechanical means for creating and maintaining the desired froth bulk density may be useful. Devices, such as rotating disc contactors, may be adapted for this purpose.

The present technique is adaptable to a variety of interphase catalytic reactions, particularly for treatment of heavy oils with hydrogen-containing gas at elevated temperature. Industrial processes employing hydrogen, especially petroleum refining, employ recycled impure gas containing 10 to 50 mole % or more of impurities, usually light hydrocarbons and nitrogen. Such reactant gases are available and useful herein, especially for high temperature hydrogenation or hydrogenolysis at superatmospheric pressure.

Figure 4:
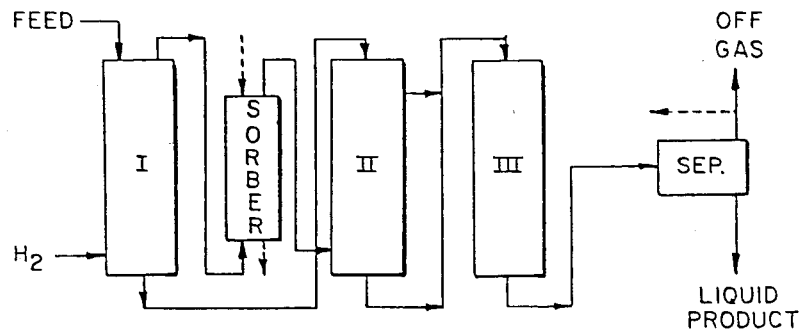
FIG. 4 is a process diagram for an integrated heavy oil refining process.

In the refining of lubricants derived from petroleum by fractionation of crude, a series of catalytic reactions are employed to severely hydrotreat, convert and remove sulfur and nitrogen contaminants, hydrocracking and isomerizing components of the lubricant charge stock in one or more catalytic reactors. This can be followed by hydrodewaxing and/or hydrogenation (mild hydrotreating) in contact with different catalysts under varying reacton conditions. An integrated three-step lube refining process disclosed by Garwood et al, in U.S. Pat. No. 4,283,271 is adaptable to countercurrent processing according to the present invention. This modification is depicted schematically in FIG. 4, wherein a waxy lubricant oil petroleum fraction is introduced to stage I (severe hydrotreating, cracking, etc.) countercurrently with a gas stream containing hydrogen reactant. Product gas from the first stage may contain converted sulfur and/or nitrogen which can be removed by a sorber prior to introduction to the bottom of the Stage II hydrodewaxing reactor for countercurrent contact with liquid from the bottom of Stage I. Following dewaxing, the gas and liquid streams are then combined for cocurrent downflow through the mild hydrotreating reactor in Stage III. Treated lube oil liquid product is recovered from a phase separator. Spent hydrogen may be recovered as off gas or purified for recycle in a known manner.

The advantages of the present invention include: (1) longer liquid residence time in contact with the catalyst than with a typical cocurrent downflow reactor or in an entrained up-flow reactor; (2) countercurrent flow pattern will lessen the need for large volumes of gas and alleviate flow maldistribution characteristic of prior art mixed phase cocurrent flow; (3) upward flowing gas bubbles serve to agitate the downward moving froth and thus facilitate intimate contact between the gas, liquid, and solid (catalyst) phases.

While the invention has been explained by reference to preferred embodiments, there is no intent to limit the inventive concept, except as set forth in the following claims.

What is claimed is:

1. In the process for catalytic hydrocracking, dewaxing or desulfurizing of heavy petroleum feedstock in a multi-phase catalytic reaction zone containing a fixed porous bed of solid catalyst particles; the improvement which comprises:
   introducing the heavy feedstock predominately in liquid phase under superatmospheric process conditions at elevated temperature and distributing the feedstock uniformly over the catalyst bed for downward flow in contact with the catalyst;
   introducing a pressurized reactant gas rich in hydrogen below the catalyst bed at a rate to establish countercurrent contact dispersed in downcoming liquid;
   disengaging upwardly flowing dispersed gas from feedstock above the catalyst bed;
   controlling froth level to prevent substantial entrainment of liquid in disengaged gas by measuring froth level in the froth zone and generating a control signal representative of said froth level, regulating flow of the petroleum and/or the inflow of the pressurized reactant gas in response to the control signal; and
   recovering treated petroleum and offgas.

2. The process of claim 1 wherein the feedstock consists essentially of waxy oil and the catalyst comprises a ZXSM-5 type medium pore zeolite.

3. A countercurrent continuous process for treating a viscous liquid hydrocarbon with a gaseous reactant comprising the steps of:
   containing a fixed porous bed of solid catalyst in an enclosed reactor shell;
   introducing a stream of liquid hydrocarbon at an upper liquid inlet substantially above the catalyst bed for downward gravity flow through the bed;
   withdrawing treated liquid from a lower liquid outlet of the reactor shell;
   introducing a gaseous reactant stream under pressure at a gas inlet disposed below the catalyst bed for countercurrently contacting downwardly flowing liquid in a mixed phase reaction zone, whereby gaseous reactant is dispersed through the liquid phase in intimate contact with the solid catalyst;

withdrawing gas from the reactor shell through an upper gas outlet means above the catalyst bed;

detecting level of a mixed gas-liquid froth in a froth zone above the catalyst bed and generating a signal representative of froth level; and regulating froth level above the catalyst bed by fluid handling control means operatively connected to the level detector and responsive to said level signal to control flow rate for withdrawing treated liquid at increased rate with increased froth level, thereby permitting disengagement of dispersed gas from the liquid phase of the froth and preventing excessive liquid entrainment in the gas outlet.

4. The process of claim 3 wherein the catalyst solids has an average size greater than about 0.5 cm and a void fraction greater than about 0.5.

5. The process of claim 3 including the step of contacting liquid feed with exiting gas in a top reactor stripping section.

6. The process of claim 3 further comprising uniformly applying liquid across the reactor cross-section above the froth.

7. The process of claim 6 including applying liquid with a horizontal distributor plate having a plurality of liquid orifices disposed therein at uniformly spaced points and permitting disengaged gas to exit from the lower reactor section through a vapor riser.

8. The process of claim 3 wherein the level detector includes differential pressure measuring means for detecting froth level between predetermined vertical points in the froth zone.

9. The process of claim 3 wherein the liquid hydrocarbon comprises petroleum residuum having foaming characteristics.

10. The process of claim 9 wherein the reactant gas comprises hydrogen.

11. In the process for catalytic treating waxy heavy petroleum feedstock in a multi-phase catalytic reaction zone containing a fixed porous bed of solid medium pore zeolite catalyst particles; the improvement which comprises:

introducing the heavy feedstock predominately in liquid phase under superatmospheric process conditions at elevated temperature and distributing the feedstock uniformly over the catalyst bed for downward flow in contact with the catalyst;

introducing a pressurized reacting gas rich in hydrogen below the catalyst bed at a rate to establish countercurrent contact dispersed in downcoming liquid;

disengaging upwardly flowing dispersed gas from feedstock above the catalyst bed;

controlling mixed gas-liquid froth level to prevent substantial entrainment of liquid in disengaged gas by measuring differential pressure between vertically spaced points in the froth zone, generating a control signal in response to said differential pressure measurement and regulating the outflow of a treated petroleum stream, the inflow of the liquid phase heavy feedstock, and/or the inflow of the pressurized reactant gas in response to the froth level control signal; and recovering treated petroleum and offgas.

12. The process of claim 11 wherein the feedstock consists essentially of waxy oil and the catalyst comprises a ZSM-5 medium pore zeolite.

* * * * *